United States Patent
Ohashi

(10) Patent No.: US 8,509,598 B1
(45) Date of Patent: Aug. 13, 2013

(54) ELECTRONIC APPARATUS AND INDEX GENERATION METHOD

(75) Inventor: Jun Ohashi, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/611,277

(22) Filed: Sep. 12, 2012

(51) Int. Cl.
*H04N 9/80* (2006.01)
*H04N 5/935* (2006.01)
*H04N 5/783* (2006.01)
*H04N 5/93* (2006.01)

(52) U.S. Cl.
USPC .......... 386/248; 386/220; 386/219; 386/344; 386/356

(58) Field of Classification Search
USPC ................... 386/220, 219, 326, 248, 356
See application file for complete search history.

(56) References Cited

U.S. PATENT DOCUMENTS

| | | | |
|---|---|---|---|
| 5,619,337 A * | 4/1997 | Naimpally | 386/329 |
| 5,909,257 A * | 6/1999 | Ohishi et al. | 348/726 |
| 6,804,266 B1 * | 10/2004 | Kovacevic et al. | 370/505 |
| 7,343,381 B2 | 3/2008 | Shin | |
| 7,394,829 B2 * | 7/2008 | Sato | 370/486 |
| 7,428,553 B2 | 9/2008 | Shin | |
| 7,444,357 B2 | 10/2008 | Shin | |
| 7,478,415 B1 | 1/2009 | Takeuchi | |
| 7,779,442 B1 * | 8/2010 | Fukuzawa et al. | 725/50 |
| 7,826,720 B2 * | 11/2010 | Seo et al. | 386/334 |
| 7,895,616 B2 * | 2/2011 | Unger | 725/31 |
| 2004/0210570 A1 | 10/2004 | Shin | |
| 2007/0124151 A1 | 5/2007 | Shin | |
| 2008/0133464 A1 | 6/2008 | Shin | |
| 2010/0138887 A1 | 6/2010 | Nakata | |

FOREIGN PATENT DOCUMENTS

| | | |
|---|---|---|
| JP | 2001-218143 A | 8/2001 |
| JP | 2004-194215 A | 7/2004 |
| JP | 2005-222545 A | 8/2005 |
| JP | 2009-272791 A | 11/2009 |

* cited by examiner

*Primary Examiner* — Helen Shibru
(74) *Attorney, Agent, or Firm* — Knobbe Martens Olson & Bear LLP

(57) ABSTRACT

According to one embodiment, an electronic apparatus receives a first packet group of a stream of content data. The apparatus includes a first detector, a second detector and an index generator. The first detector detects a first packet of the first packet group, the first packet including program information. The second detector detects a start packet of a second packet group from the first packet group, the second packet group carrying a randomly accessible video frame. The second detector detects a time stamp from the start packet or another packet having the same packet ID. The index generator generates index information indicating a storage position of the first packet in a buffer and the time stamp.

12 Claims, 12 Drawing Sheets

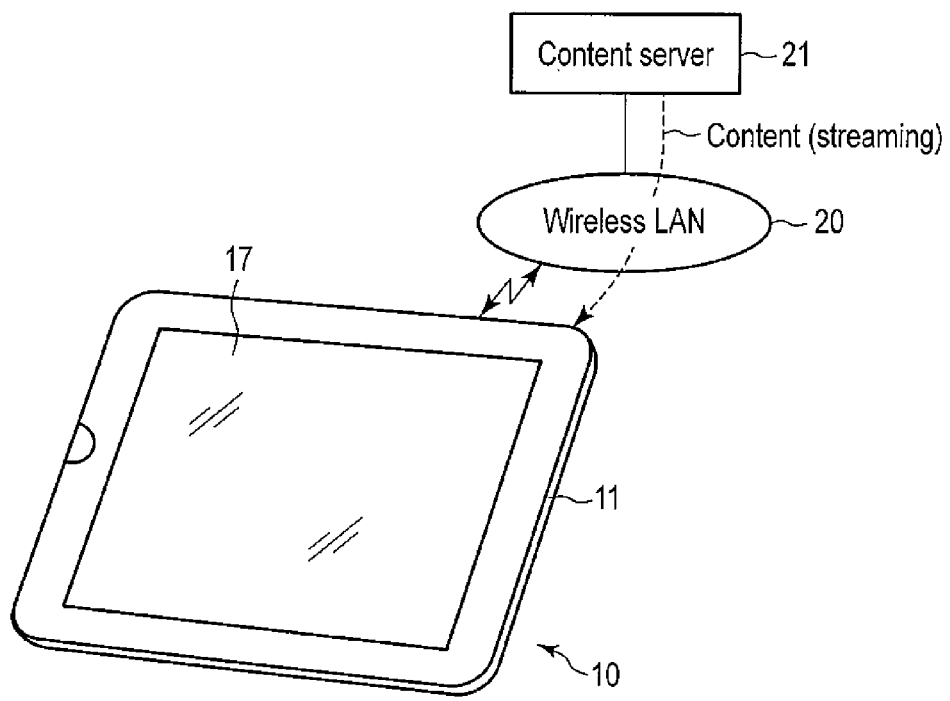
F I G. 1
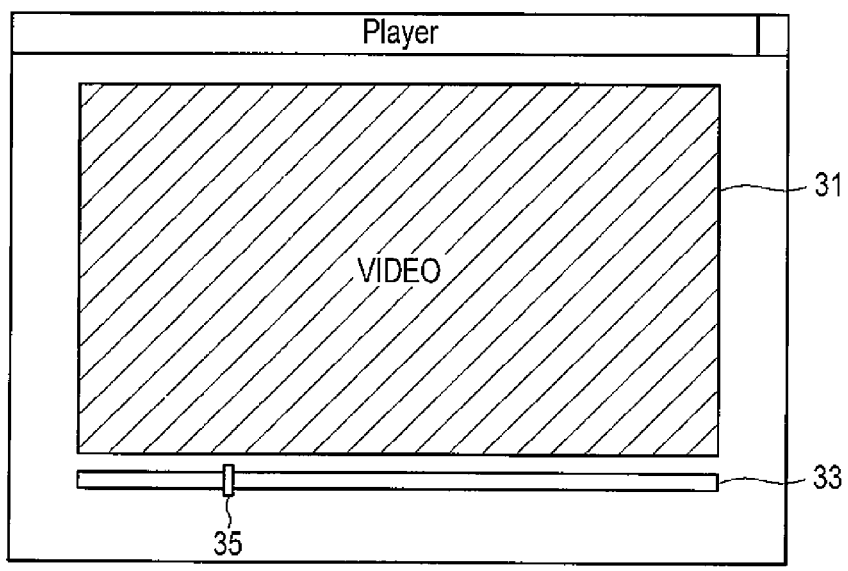
F I G. 2

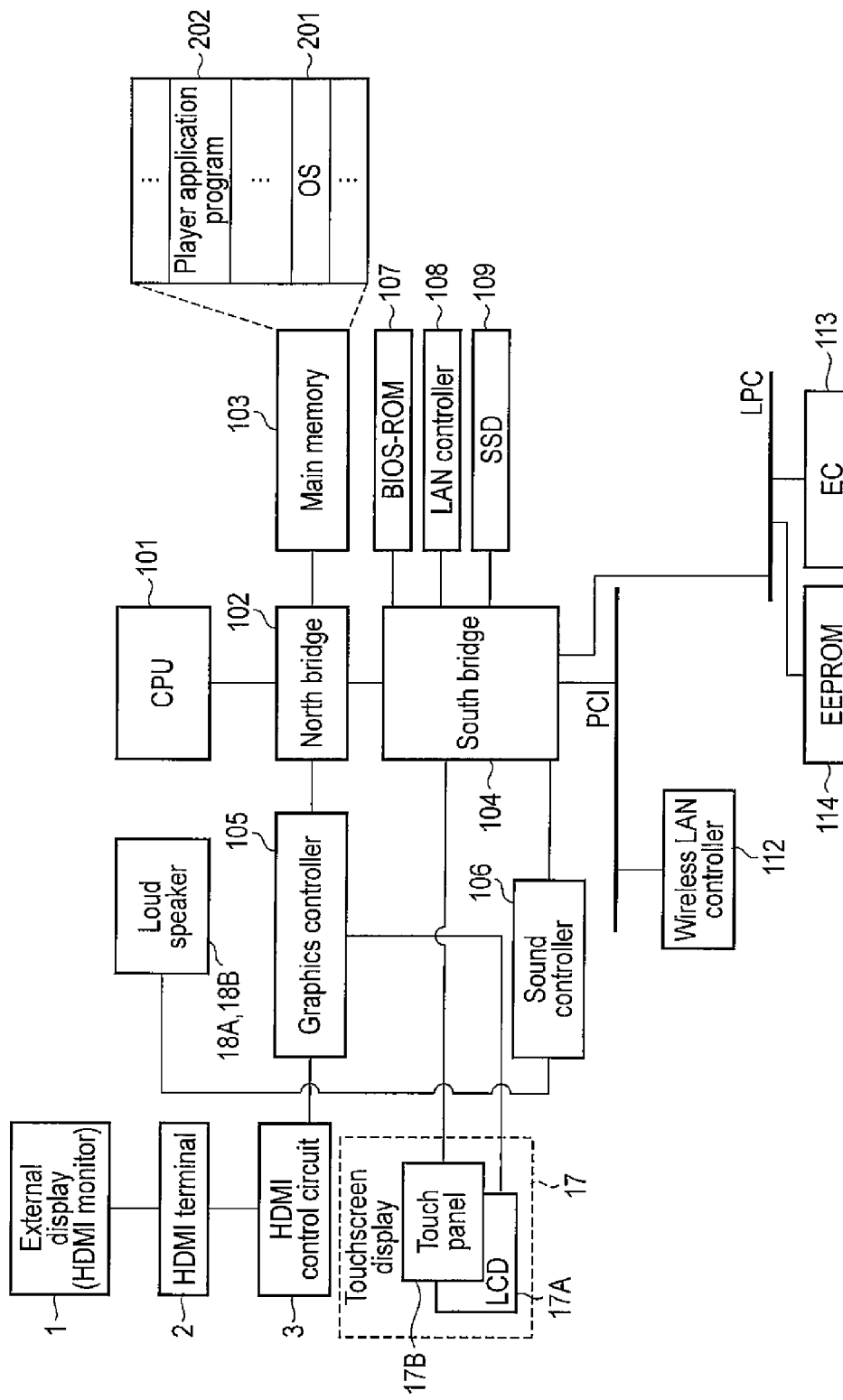
F I G. 3

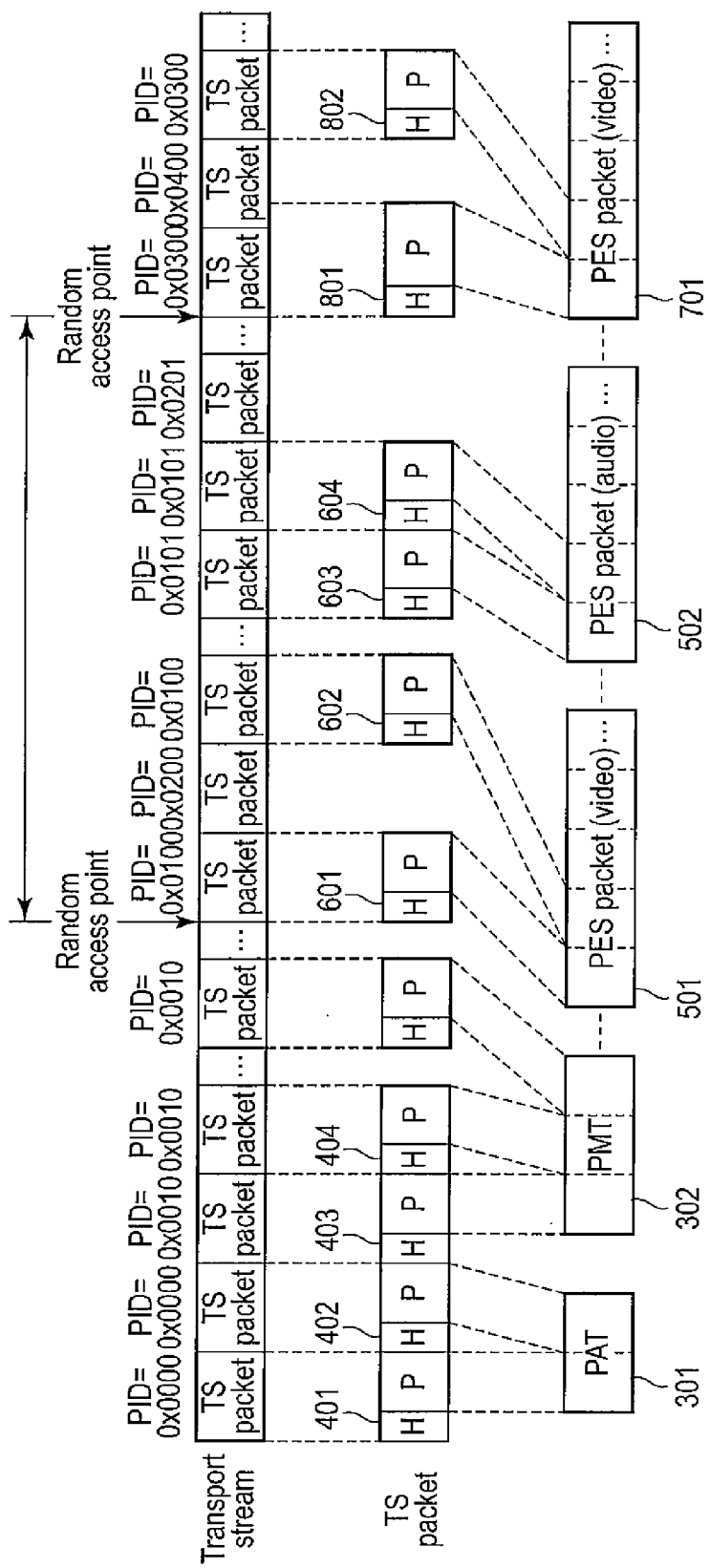
F I G. 5

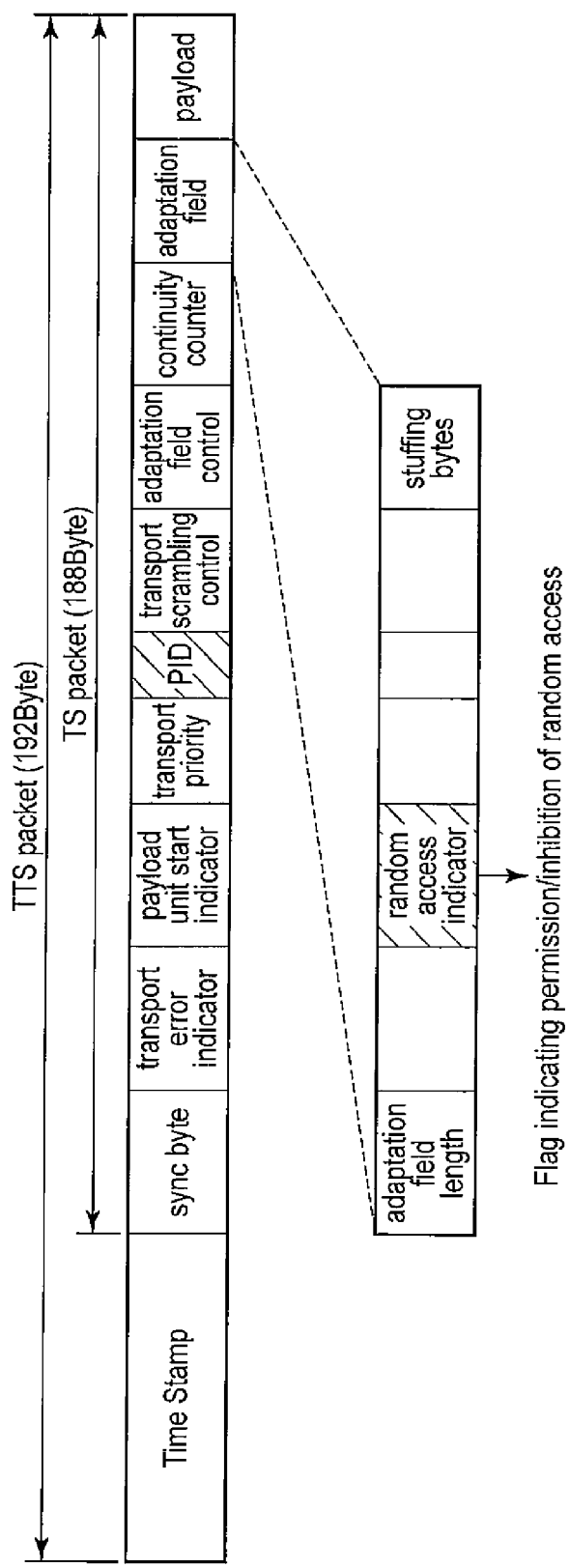
F I G. 6

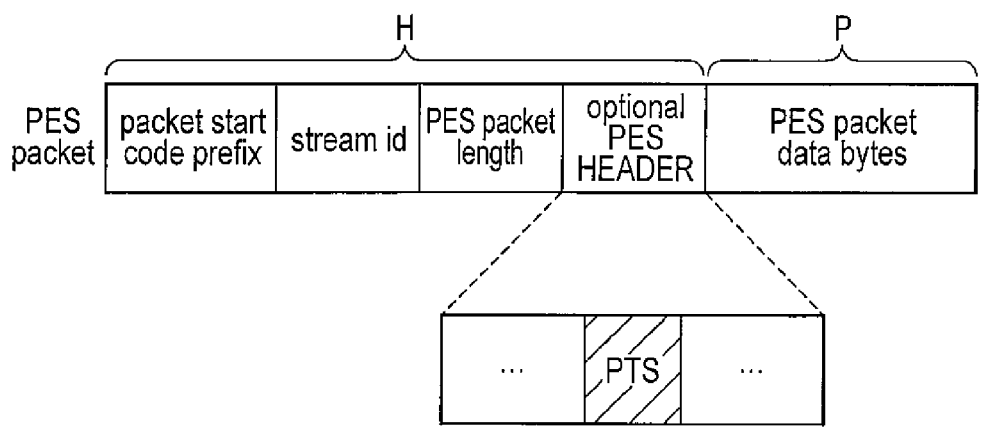
F I G. 7
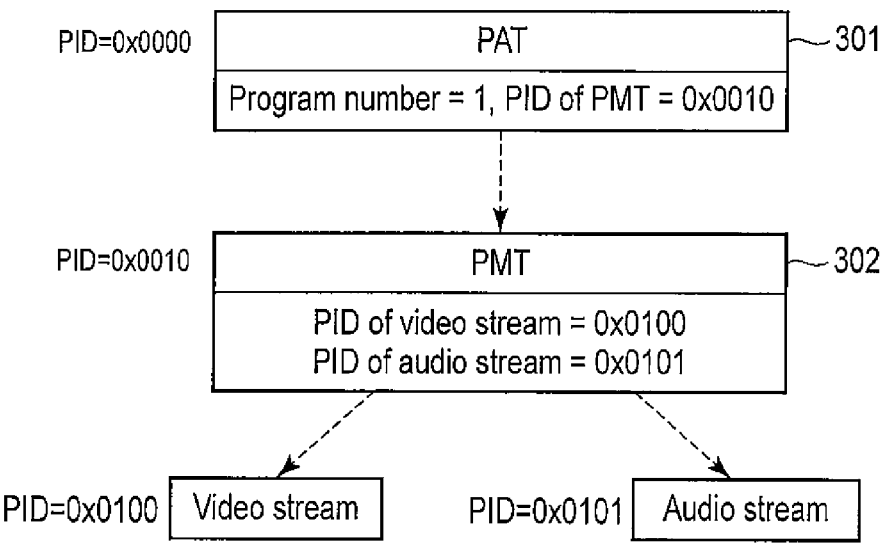
F I G. 8

| Intra-buffer offset of PAT | Time stamp [ ms ] |
|---|---|
| 160 | 1000 |
| 11000 | 2000 |
| ⋮ | ⋮ |

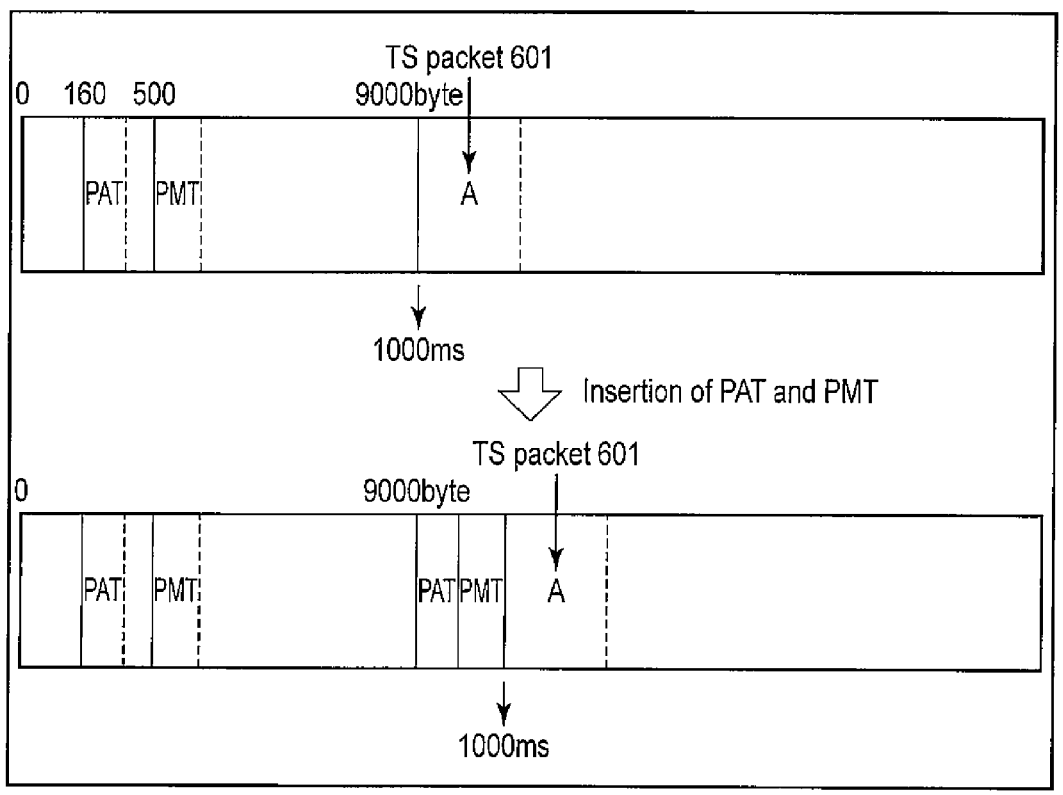
F I G. 11

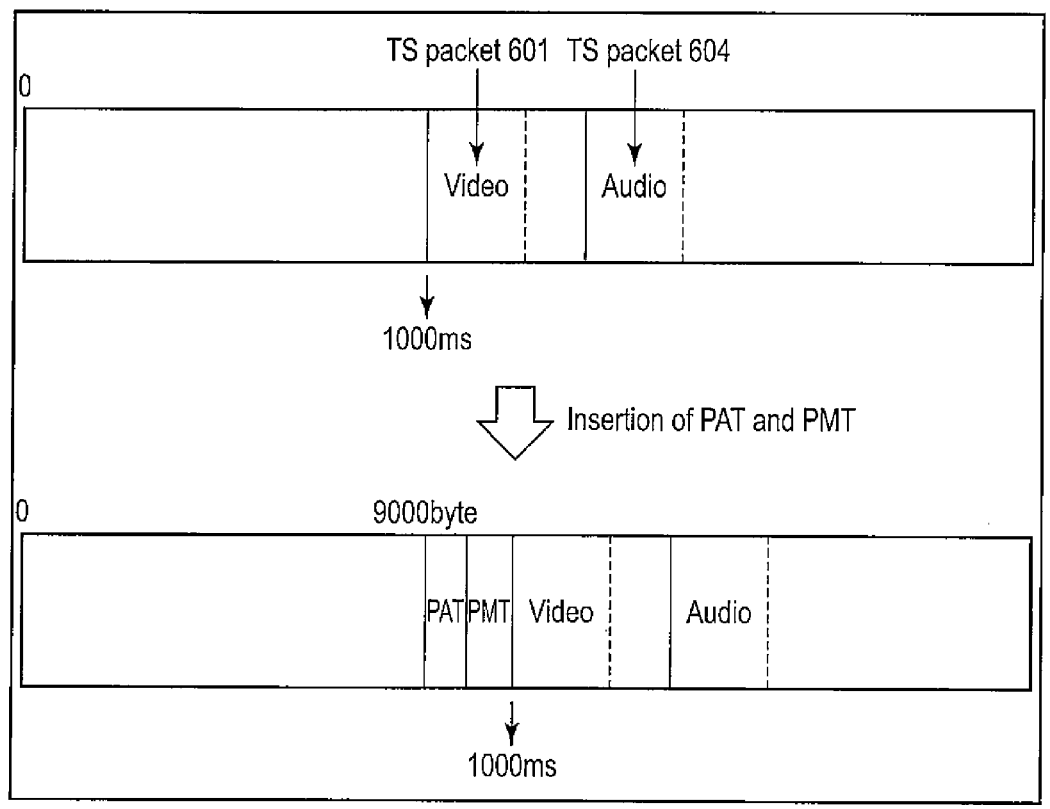
F I G. 12
F I G. 13

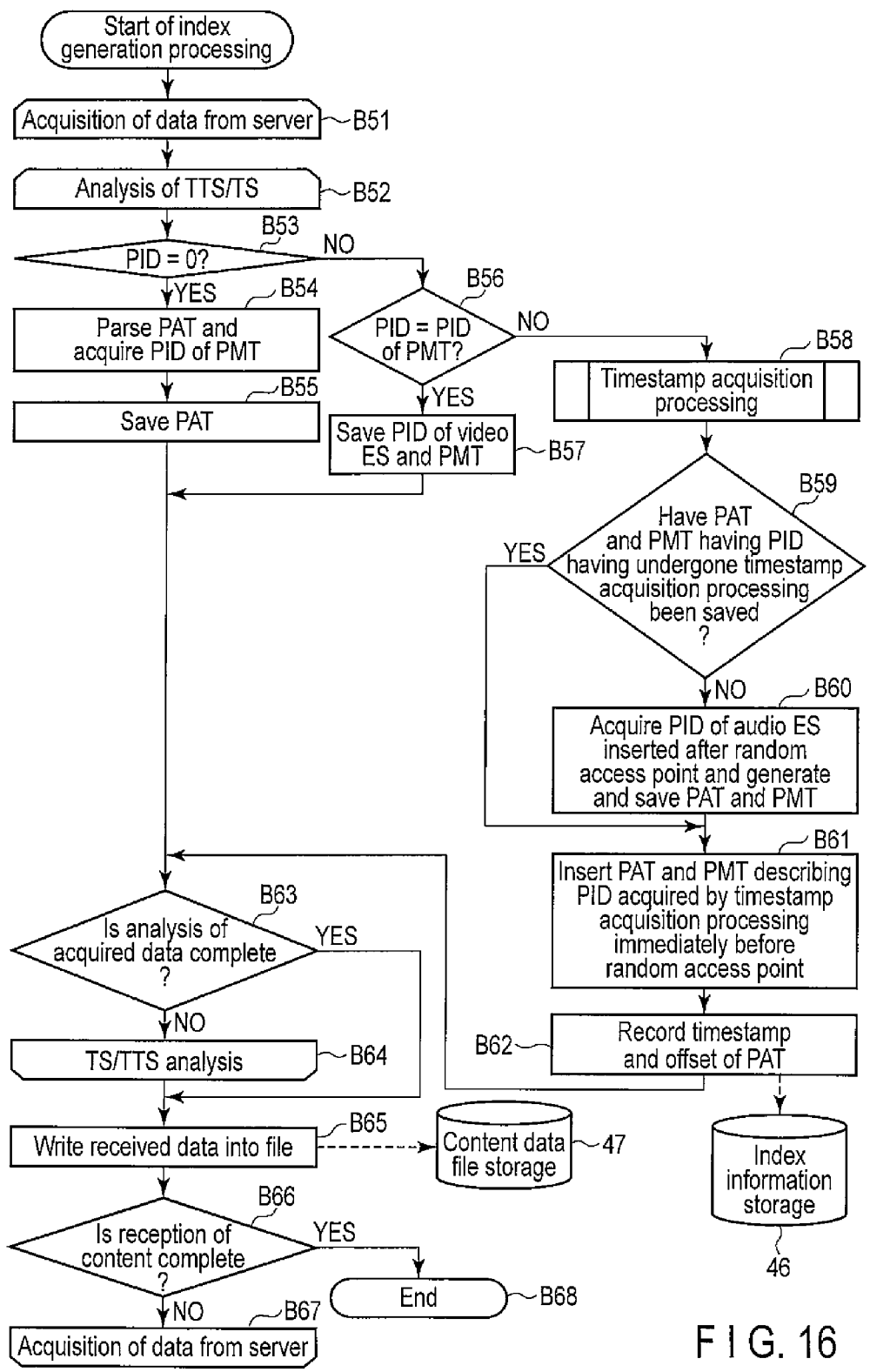
F I G. 16

ELECTRONIC APPARATUS AND INDEX GENERATION METHOD

CROSS-REFERENCE TO RELATED APPLICATIONS

This application is based upon and claims the benefit of priority from prior Japanese Patent Application No. 2012-015564, filed Jan. 27, 2012, the entire contents of which are incorporated herein by reference.

FIELD

Embodiments described herein relate generally to an electronic apparatus which can play back content data and an index generation method applied to the apparatus.

BACKGROUND

Recently, various types of electronic apparatuses such as personal computers, PDAs, and smartphones have been developed. Many of these types of electronic apparatuses have a playback function of receiving multimedia content data via a network and playing back the multimedia content data.

Such an electronic apparatus downloads video content data, music data, and the like stored in a digital media server (DMS) such as a personal video recorder via a network, and plays back the data, by using, for example, a function conforming to the Digital Living Network Alliance (DLNA) standard.

Player software executed on the electronic apparatus displays a user interface called a seek bar (or progress bar). The user can change (seek) a playback position in multimedia content data by operating the seek bar.

Content data having a file format such as MP4 standardized in MPEG includes index information for seeking.

Several types of content data (for example, MPEG-2 TS/TTS content data), however, include no index information for seeking. For this reason, the electronic apparatus is required to generate index information corresponding to a stream of MPEG-2 TS/TTS content data by analyzing a picture structure or the like in the stream. In general, however, to analyze a picture structure in a stream, it is necessary to execute processing equivalent to the processing of decoding the steam. This makes it difficult to generate index information in real time while receiving content data.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing the external appearance of an electronic apparatus according to an embodiment.

FIG. 2 is an exemplary view showing an example of the content playback screen displayed by player software executed by the electronic apparatus according to the embodiment.

FIG. 3 is an exemplary block diagram showing a system configuration of the electronic apparatus according to the embodiment.

FIG. 5 is an exemplary view for explaining transport stream (TS) packet group received from a server by the player software in FIG. 4.

FIG. 6 is an exemplary view for explaining a random-access-indicator added to a transport stream (TS) packet in FIG. 5.

FIG. 7 is an exemplary view for explaining a packetized elementary stream (PES) packet header assembled by the player software in FIG. 4.

FIG. 8 is an exemplary view for explaining a program association table (PAT) and program map table (PMT) used by the player software in FIG. 4.

FIG. 11 is another exemplary view for explaining the buffer used by the player software in FIG. 4.

FIG. 12 is another exemplary view for explaining index information generated by the player software in FIG. 4.

FIG. 13 is still another exemplary view for explaining the buffer used by the player software in FIG. 4.

FIG. 16 is an exemplary flowchart showing still another procedure of index generation processing executed by the player software in FIG. 4.

DETAILED DESCRIPTION

Figure 4:
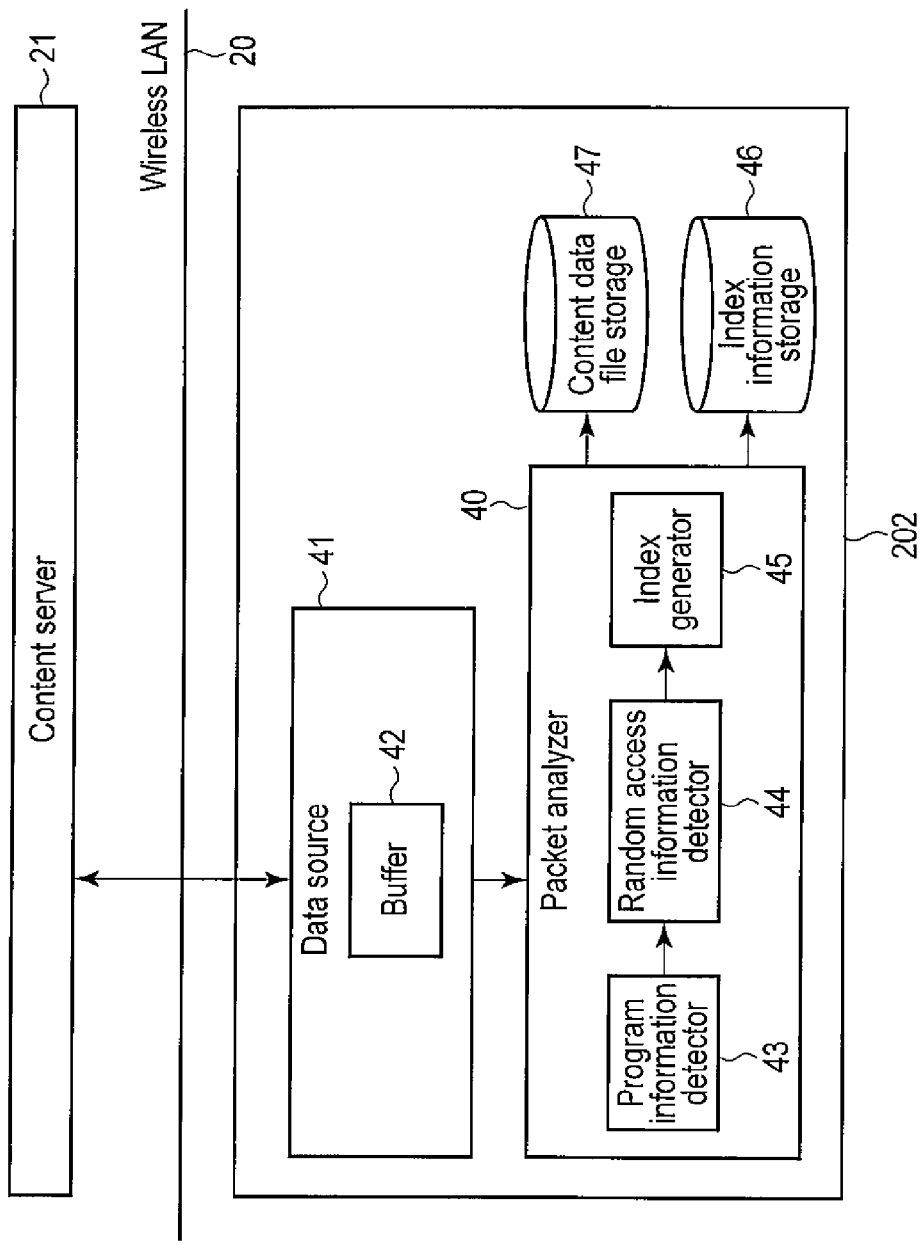
FIG. 4 is an exemplary block diagram showing a functional configuration of the player software executed by the electronic apparatus according to the embodiment.

Various embodiments will be described hereinafter with reference to the accompanying drawings.

In general, according to one embodiment, an electronic apparatus receives a first packet group of a stream of content data including one or more programs from a server. The electronic apparatus includes a buffer, a program information detector, a random access information detector, and an index generator. The buffer stores the first packet group. The program information detector detects a first packet of the first packet group, the first packet including program information for a configuration of the one or more programs. The random access information detector detects a second packet of a second packet group from among the first packet group, the second packet group carrying a randomly accessible video frame, and the second packet being a start packet of the second packet group. The random access information detector detects a time stamp from the second packet or another received packet having the same packet identifier as a packet identifier of the second packet, the time stamp being indicative of a presentation time of the randomly accessible video frame. The index generator generates index information indicative of a storage position of the first packet in the buffer and the time stamp.

FIG. 1 is a perspective view showing the external appearance of an electronic apparatus according to an embodiment. This electronic apparatus is realized as, for example, a tablet (slate) computer, laptop computer, smartphone, or PDA. Assume below that this electronic apparatus is realized as a tablet computer 10. The tablet computer 10 includes a computer main body 11 and a touchscreen display 17, as shown in FIG. 1.

The computer main body 11 has a thin box-shaped housing. The touchscreen display 17 includes a liquid crystal display (LCD) and a touchpanel. The touchpanel covers the screen of the LCD. The touchscreen display 17 is attached on the upper surface of the computer main body 11.

The computer 10 has a content playback function for playing back content data. By the content playback function, content data can also be played back by streaming. The player software installed in the computer 10 implements this content playback function. Content playback operation by the player software may be implemented by using a multimedia framework provided by an operating system. The computer 10 incorporates a communication device for executing communication via a wired or wireless network. The computer 10 executes communication with a content server 21 via, for example, a wireless local area network (wireless LAN) 20 by using the communication device.

Content data is, for example, a data stream on which video data and audio data are multiplexed. Video data may be compression encoded. Audio data may also be compression encoded. Content data may include only video data.

The player software receives content data (multimedia content data) from the content server 21 via a network such as the wireless LAN 20. The player software receives multimedia content data and simultaneously generates an index for playing back the multimedia content data. In addition, the player software can play back multimedia content data while receiving the multimedia content data, and can read multimedia content data for which an index has been generated from a storage device such as an SSD 109 and play back the read multimedia content data. In the computer 10, the received data portion in multimedia content data is stored in a buffer. The buffer is part of the memory in the computer 10. After a predetermined amount of data is stored in the buffer, the player software starts generating an index corresponding to the multimedia content data.

During index generation processing corresponding to the multimedia content data, the player software may execute look-ahead processing. Look-ahead processing is the buffering processing of sequentially receiving data portions temporally subsequent to the current index generation position from the content server 21 and storing the received data portions in the buffer. In playback processing of multimedia content data, the player software plays back each of the video data portions and audio data portions in the buffer.

FIG. 2 shows an example of the content playback screen displayed on the display 17 by the player software. The content playback screen includes a video display area 31 and a seek bar 33. The video display area 31 is a display area for displaying an image (moving image) of video data in multimedia content data. The seek bar 33 is a graphical user interface for making the user to control the playback position of the multimedia content data.

The left and right ends of the seek bar 33 respectively correspond to the start and end positions of the multimedia content data to be played back. During the playback period of the multimedia content data, the playback position of the multimedia content data is automatically updated with the lapse of time. As a value representing a playback position, an offset value may be used, which originates from the start position of the multimedia content data. An offset value corresponding to a given playback position indicates the playback time from the start position of the multimedia content data to the given playback position.

The seek bar 33 displays a slider 35. The slider 35 indicates the current playback position in the multimedia content data. That is, the slider 35 indicates the progress of playback of the multimedia content data. The user can change the playback position in the multimedia content data by moving the slider 35 by using a pointing device.

FIG. 3 is a block diagram showing the system configuration of the computer 10.

As shown in FIG. 3, the computer 10 includes a CPU 101, a north bridge 102, a main memory 103, a south bridge 104, a graphics controller 105, a sound controller 106, a BIOS-ROM 107, a LAN controller 108, a solid-state drive (SSD) 109, a wireless LAN controller 112, an embedded controller (EC) 113, an EEPROM 114, and an HDMI control circuit 3.

The CPU 101 is a processor which controls the operation of each component in the computer 10. The CPU 101 executes an operating system (OS) 201 and various application programs loaded from the SSD 109 into the main memory 103. The application programs include a player application program 202. The player application program 202 is the above player software, and is executed on the operating system (OS) 201.

The CPU 101 executes the BIOS stored in the BIOS-ROM 107. The BIOS is a program for hardware control.

The north bridge 102 is a bridge device which connects between the local bus of the CPU 101 and the south bridge 104. The north bridge 102 also incorporates a memory controller which performs access control on the main memory 103. The north bridge 102 has a function of executing communication with the graphics controller 105 via a PCI EXPRESS serial bus or the like.

The graphics controller 105 is a display controller which controls an LCD 17A used as the display monitor of the computer 10. The display signal generated by the graphics controller 105 is sent to the LCD 17A. The LCD 17A displays the video based on the display signal. A touchpanel 17B is placed on the LCD 17A. The touchpanel 17B is a pointing device for performing input operation on the screen of the LCD 17A. The user can operate a graphical user interface (GUI) or the like displayed on the screen of the LCD 17A by using the touchpanel 17B. For example, the user can instruct the computer 10 to execute a function corresponding to a button displayed on the screen by touching the button.

An HDMI terminal 2 is an external display connection terminal. The HDMI terminal 2 can send an uncompressed digital video signal and digital audio signal to an external display 1 via a cable. The HDMI control circuit 3 is an interface for sending a digital video signal to the external display 1 called an HDMI monitor via the HDMI terminal 2. That is, the computer 10 can connect to the external display 1 via the HDMI terminal 2 or the like.

The south bridge 104 controls each device on a Peripheral Component Interconnect (PCI) bus and each device on a Low Pin Count (LPC) bus. The south bridge 104 also incorporates an ATA controller for controlling the SSD 109.

The south bridge 104 incorporates a USB controller for controlling various types of USB devices. The south bridge 104 also has a function of executing communication with the sound controller 106. The sound controller 106 is a sound source device, which outputs audio data to be played back to loudspeakers 18A and 18B. The LAN controller 108 is a wired communication device which executes wired communication conforming to, for example, the IEEE 802.3 standard. The wireless LAN controller 112 is a wireless communication device which executes wireless communication conforming to, for example, the IEEE 802.11 standard.

The EC 113 is a one-chip microcomputer including an embedded controller for power management. The EC 113 has a function of powering on/off the computer 10 in accordance with the operation of a power button by the user.

The functional configuration of the player application program 202 will be described with reference to FIG. 4. For the sake of simplicity, an index generation function of the functions which the player application program 202 has will be described, but a description of a playback control function for playing back content data and the like will be omitted. The player application program 202 is provided with a demultiplexer, video decoder, audio decoder, renderer, and the like (not shown), and can play back content data and seek a playback position in content data by using index information.

The player application program 202 includes a data source 41 and a packet analyzer 40. The data source 41 sequentially executes the processing for receiving multimedia content data from the content server 21 and stores the respective received data portions in a buffer 42 (buffering). For example, the data source 41 receives content data when the content server 21 transmits the content data in response to a user's request to download the content data.

In this buffering, the data source 41 sequentially receives a packet group (first packet group) constituting a stream of content data including one or more programs from the server 21. This program is a unit including video and audio bit streams and the like. Each packet in the packet group is a transport stream (TS) packet. Each packet in the packet group may also be a time stamped TS packet (TTS packet). A TTS packet is a kind of TS packet, and is a packet having a time stamp added to the start of a TS packet.

A TS/TTS packet is a packet for transporting program information for the configuration of a program, a bit stream, and the like. Program information is multiplexed based on a data structure called a section, and then multiplexed by using TS packets. A bit stream is multiplexed by using a packetized elementary stream (PES) packet, and then multiplexed by using TS packets. The buffer 42 stores a received TS/TTS packet group, i.e., part of content data.

The packet analyzer 40 generates an index for content data by analyzing the received TS/TTS packet group. The packet analyzer 40 includes a program information detector 43, a random access information detector 44, and an index generator 45. The packet analyzer 40 generates, for example, index information for seeking with respect to content data in real time during buffering.

The packet analyzer 40 generates this index information by using the program information included in content data. As described above, a TS packet group (first packet group) forming a stream of content data including one or more programs includes a TS packet including program information indicative of the configuration of the one or more programs. Program information is placed, in units of section, in the payload of each TS packet, and the each TS packet is then transmitted. Program information includes, for example, a program association table (PAT) and a program map table (PMT). A program association table (PAT) describes the correspondence between one or more programs and packet identifiers (PIDs) of one or more packets including a program map table (PMT). The packet identifier (PID) of a TS packet including a PAT defines that "0" (0x0000) is set. That is, it is possible to acquire a TS packet (first packet) including a PAT by detecting a TS packet in which a PID is "0". In addition, a program map table describes the packet identifier (PID) of a TS packet corresponding to an elementary stream (ES) of a program (the first program of one or more programs). It is therefore possible to extract only a TS packet of a given program from received TS packets by referring to a PAT and a PMT. The program can be played back by decoding the elementary stream (payload) included in the extracted TS packet.

To support this index information generating operation, when transmitting a TS packet corresponding to each random access point in content data, the server 21 sets "1" to a random-access-indicator flag (random_access_indicator) in the header of the TS packet. Note that the server 21 may set a flag indicating a random access point in an arbitrary field in the header of a TS/TTS packet.

A TS packet in which a random access indicator flag (random_access_indicator) is set is the start TS packet (second packet) in a plurality of TS packets (second packet group) for carrying a randomly accessible video frame. A packetized elementary stream (PES) packet for carrying a given video frame is transmitted upon being divided into the payloads of a plurality of TS packets having the same packet identifier (PID). Therefore, a TS packet in which a random-access-indicator flag (random_access_indicator) is set is the start TS packet of a plurality of TS packets in which parts of a PES packet for carrying a randomly accessible video frame are assigned. A randomly accessible video frame is a video frame which can be decoded without referring to other video frames, for example, Instantaneous Decoder Refresh (IDR) frame of H.264 or I (Intra) frame of MPEG-2 video.

The server 21 sets "1" to random_access_indicator in the header of the start TS packet of a plurality of TS packets to which parts of a PES packet storing a randomly accessible video frame are assigned.

The program information detector 43 provided in the packet analyzer 40 detects the first packet including program information for the configuration of one or more programs. More specifically, the program information detector 43 refers to the header of a received TS packet to determine whether the received TS packet is a TS packet including a PAT, i.e., a TS packet having the packet identifier (PID) of "0" (0x0000). If the received TS packet is a TS packet (first packet) including a PAT, the program information detector 43 acquires (detects) the storage position of the TS packet in the buffer 42. As the storage position of a TS packet including a PAT in the buffer 42, for example, an offset position in the buffer 42 at which the TS packet is stored. Note that the program information detector 43 may acquire an offset position in the buffer 42 at which a PAT is stored. The program information detector 43 outputs the acquired position in the buffer 42 to the random access information detector 44.

In addition, the random access information detector 44 refers to the header of the received TS packet to determine whether the received TS packet is a TS packet in which a random-access-indicator flag (random_access_indicator) is set, i.e., a TS packet having "1" set in random_access_indicator. Note that the random access information detector 44 may determine, based on the flag set in an arbitrary field in the header of the TS packet, whether the received TS packet is a TS packet corresponding to a random access point. If the received TS packet is a TS packet (second packet) in which a random-access-indicator flag (random_access_indicator) is set, the random access information detector 44 acquires (detects) a time stamp indicating the presentation time of a randomly accessible video frame from the TS packet in which this random-access-indicator flag (random_access_indicator) is set or another received TS packet having the same packet identifier (PID) as the identifier of the TS packet (second packet) in which the random access indicator flag (random_access_indicator) is set.

In this case, the random access information detector 44 may assemble the header of a PES packet carrying a randomly accessible video frame by using the TS packet in which random-access-indicator flag (random_access_indicator) is set and one or more other received TS packets having the same packet identifier as that of the TS packet in which this random access indicator flag (random_access_indicator) is set, and acquire a time stamp (presentation time stamp (PTS)) from the assembled header. The time stamp indicates the presentation time of the randomly accessible video frame. The header of a PES packet is sometimes distributed in several TS packets. Therefore, assembling the header of a PES packet and acquiring a PTS from the assembled header in the above manner can more accurately acquire a PTS corresponding to a randomly accessible video frame, even if the header of the PES packet is distributed in several TS packets.

The random access information detector 44 outputs, to the index generator 45, the acquired presentation time (PTS) and the offset position in the buffer 42 at which the TS packet including a PAT and immediately previously output from the program information detector 43 is stored (i.e., the offset position in the buffer 42 at which a TS packet including a PAT and output immediately before a TS packet in which random-access-indicator flag is set in a transport sequence is stored).

The index generator 45 then generates index information indicating the presentation time (PTS) and the storage position of the TS packet including the PAT in the buffer 42 which are output from the random access information detector 44. This index information is stored in an index information storage area 46. Every time a TS packet (second packet) in which a random-access-indicator flag (random_access_indicator) is set is received, index information corresponding to a new randomly accessible video frame is generated. With this operation, a pair of a presentation time and a storage position of a PAT in the buffer 42 (intra-buffer offset) for each randomly accessible video point in the data stored in the buffer 42 is stored in the index information storage area 46 as index information. The index information storage area 46 is, for example, a predetermined storage area in the SSD 109. Note that the index generator 45 may generate index information indicative of a presentation time (PTS) and an offset position in the buffer 42 at which a PAT is stored.

In addition, upon completion of analysis of received content data, the index generator 45 writes the received data (i.e., the content data stored in the buffer 42) into a file and stores the file in a content data file storage area 47. The content data file storage area 47 is, for example, a predetermined storage area in the SSD 109. The content data file and the above index information are stored in association with each other.

Generating index information used for seeking by simple processing during buffering in this manner can improve the accuracy and response of seeking at the time of content playback. In addition, letting index information include the offset of a PAT which must be referred to at the time of random access makes it possible to accurately seek even content data having video or audio streams which are switched. It is also possible to perform the above index information generation processing concurrently with streaming playback of content data.

As described above, index information and a content data file which correspond to a given content are stored in association with each other. Therefore, when the user changes the content playback position to a position (change destination playback position) different from the current playback position by moving the slider 35, a presentation time (seek destination time) corresponding to the change destination playback position is calculated, and the offset of the PAT in the buffer which corresponds to the seek destination time is detected. Then, a data portion corresponding to the PAT from the data in the buffered content data file is detected. The PMT of a program to be played back is acquired based on the packet identifier of the PMT described in the PAT stored in this data portion. By referring to the acquired PMT, the packet identifier of a TS packet for carrying an elementary stream of the program is acquired. It is possible to move the playback position of a content item to the designated seek position by decoding and playing back data in a TS packet having the acquired packet identifier (a TS packet having the acquired packet identifier and located immediately after a PAT in the buffer 42).

Note that the packet analyzer 40 may insert an immediately preceding PAT and a PMT describing the PID of a TS packet in which a random-access-indicator flag is set immediately before the TS packet in which the random-access-indicator flag is set, and generate index information.

In this case, the program information detector 43 detects the TS packet (first packet) including the PAT. The program information detector 43 acquires a PAT by assembling one or more TS packets including the PAT. The program information detector 43 outputs the acquired PAT to the random access information detector 44.

The program information detector 43 also detects the packet identifier (PID) of a PMT for each program by referring to the acquired PAT. The program information detector 43 acquires one or more TS packets (third packet) including a PMT by detecting a TS packet having the same PID as the detected PID. The program information detector 43 acquires the PMT which has assembled the TS packets including the PMT, and outputs the acquired PMT to the random access information detector 44.

The random access information detector 44 detects a TS packet (second packet) in which a random access indicator flag (random_access_indicator) is set by referring to the header of the received TS packet. The random access information detector 44 acquires a position in the buffer 42 at which the TS packet in which the random-access-indicator flag is set is stored. The random access information detector 44 acquires a time stamp indicative of the presentation time of a randomly accessible video frame from this TS packet in which the random-access-indicator flag is set or another received TS packet having the same packet identifier (PID) as the PID of the TS packet in which the random-access-indicator flag is set.

The random access information detector 44 detects a PMT, of the PMTs output from the program information detector 43, which describes the PID of the TS packet in which the random-access-indicator flag is set. The random access information detector 44 outputs the acquired position in the buffer 42 at which the TS packet in which the acquired random-access-indicator flag is set is stored, the acquired presentation time (PTS), the PAT immediately previously output from the program information detector 43, and the detected PMT, to the index generator 45.

The index generator 45 inserts the PAT and PMT (the TS packet including the PAT and the TS packet including the PMT) output from the random access information detector 44 immediately before a position in the buffer 42 at which the TS packet (second packet) in which the random-access-indicator flag is set is stored. The index generator 45 then generates index information indicative of the presentation time (PTS) of the randomly accessible video frame and an offset position in the buffer 42 at which the inserted PAT is stored. This index information is stored in the index information storage area 46.

The index generator 45 writes the content data (including the inserted PAT and PMT) stored in the buffer 42 into a file, upon completion of analysis of the received content data, and stores the file in the content data file storage area 47.

In this manner, a PAT and a PMT are inserted immediately before a TS packet in which a random access indicator flag is set, and index information, which is indicative of the presentation time (PTS) of a randomly accessible video frame and the offset position in the buffer 42 at which the inserted PAT is stored, is generated in advance. Thereby reducing the amount of data to be read at the time of seek operation, and improving the response.

The packet analyzer 40 may also generate index information by newly generating a PAT and/or a PMT, if a TS packet including a PAT and/or a TS packet including a PMT describing the PID of a TS packet in which a random-access-indicator flag is set are not received before the TS packet in which the random access indicator flag is set.

In this case, the random access information detector 44 detects a TS packet in which a random access indicator flag is set, by referring to the header of a received TS packet to detect a TS packet in which a random-access-indicator flag is set. The random access information detector 44 acquires a position in the buffer 42 at which the TS packet in which the random-access-indicator flag is set is stored. The random access information detector 44 then acquires a time stamp indicative of the presentation time of a randomly accessible video frame from the TS packet in which this random-access-indicator flag is set or another received TS packet having the same packet identifier (PID) as the PID of the TS packet in which the random-access-indicator flag is set. The random access information detector 44 outputs the PID of the TS packet in which the random-access-indicator flag is set, the storage position of the TS packet in the buffer 42, and the presentation time (PTS), to the index generator 45.

Assume that the TS packet in which the random access indicator flag (random_access_indicator) is set is received, but a TS packet including a PAT and/or a TS packet including a PMT describing the PID of a TS packet in which a random-access-indicator flag (random_access_indicator) is set have not received. In this case, since the TS packet in which the random access indicator flag is set includes a video stream, the index generator 45 detects a TS packet (fourth packet) including an audio stream which is received immediately after the TS packet in which the random access indicator flag is set. The index generator 45 determines, based on, for example, the value set in the stream id field in the header of the PES packet, whether the TS packet is a TS packet including an audio stream.

The index generator 45 generates a PMT (sixth packet including the PMT) describing the PID of the TS packet in which a random-access-indicator flag (random_access_indicator) is set (i.e., a TS packet including a video stream) and the PID of the detected TS packet including the audio stream, and generates a PAT (fifth packet including the PAT) describing the PID of the PMT. The index generator 45 inserts the generated PAT and PMT (the fifth packet including the PAT and the sixth packet including the PMT) immediately before the position in the buffer 42 at which the TS packet in which the random-access-indicator flag (random_access_indicator) is set is stored. The index generator 45 generates index information indicative of the presentation time (PTS) of a randomly accessible video frame and the offset position in the buffer 42 at which the inserted PAT (fifth packet) is stored. This index information is stored in the index information storage area 46.

Upon completion of analysis of the received content data, the index generator 45 writes the content data (including the inserted PAT and PMT) stored in the buffer 42 into a file and stores the file in the content data file storage area 47.

As described above, when TS packets including a PAT and a PMT have not received before a TS packet in which a random-access-indicator flag is set is received, a PAT and a PMT corresponding to the TS packet in which the random-access-indicator flag is set are newly generated. The generated PAT and PMT are inserted immediately before the TS packet in which the random-access-indicator flag is set, and index information is then generated. Thereby reducing the amount of data to be read at the time of seek operation, and improving the response and seek accuracy.

A TS packet group received from the server 21 by the player software 202 will be described with reference to FIG. 5.

A transport stream consists of a sequence of TS packets (or TTS packets). Each TS packet is a fixed-length (e.g., 188 bytes) packet, and includes a header (H) and a payload (P). A bit stream of content data or program information of content data is transmitted by a TS packet group. This bit stream includes video and audio streams.

Program information includes, for example, a program association table (PAT) or a program map table (PMT), as described above. A PAT or PMT is placed in a payload in one or more TS packets and is transmitted. For example, a PAT 301 is divided into a plurality of TS packets 401 and 402 whose PID is 0x0000. For example, a PMT is divided into TS packets 403, 404, . . . having the same PID (in this case, 0x0010). A PAT and PMT are periodically (for example, every 100 milliseconds) inserted in a TS packet sequence.

In a video stream, a plurality of randomly accessible positions (random access points) are set. Random access points are set at, for example, intervals of about 0.5 seconds. The positions of randomly accessible video frames in a video stream correspond to random access points. The time interval between a certain random access point and the next random access point is, for example, about 0.5 seconds.

A video stream is packetized by a PES packet group. The payload (P) of each PES packet includes the data of an access unit (a video frame). The header (H) of each PES packet includes the PTS of a corresponding video frame. A PES packet is divided into the payloads of a plurality of TS packets having the same PID and transmitted.

Assume that the payload of a PES packet 501 includes a randomly accessible video frame. The PES packet 501 is divided into a plurality of TS packets 601, 602, . . . having the same PID (in this case, 0x0100). In this case, in this embodiment, "1" is set in random_access_indicator in the header of the start TS packet 601.

Assume that the payload of a PES packet 701 includes a randomly accessible video frame. The PES packet 701 is divided into a plurality of TS packets 801, 802, . . . , having the same PID (in this case, 0x0300). In this case, "1" is set in random_access_indicator in the header of the start TS packet 801.

Likewise, an audio stream is packetized by a PES packet group. The payload (P) of each PES packet includes the data of an access unit. The header (H) of each PES packet includes the PTS of corresponding audio data. A PES packet is divided into the payloads of a plurality of TS packets having the same PID and transmitted. For example, a PES packet 502 is divided into a plurality of TS packets 603, 604, . . . , having the same PID (in this case, 0x0101).

FIG. 6 shows the configuration of a TS/TTS packet. The header of a TS/TTS packet includes a field storing a PID, a field storing random_access_indicator, and the like. A general system does not often use a field storing random_access_indicator. This is because a decoder can determine, by analyzing a picture structure, whether each video frame is a randomly accessible video frame. However, since the amount of processing required to analyze a picture structure is large, analyzing a picture structure during buffering will increase the load on the buffering processing. This may lead to a decrease in buffering speed. In this embodiment, a TS packet in which "1" is set in random_access_indicator is detected, and the PTS existing in the header of a PES packet corresponding to the TS packet is acquired. This makes it possible to generate index information by simple processing without analyzing a picture structure. Note that it is possible to detect the start TS/TTS packet corresponding to a random access point by setting a flag in an arbitrary field in the header of the TS/TTS packet instead of a field storing random_access_indicator.

FIG. 7 shows the configuration of a PES packet. The header of a PES packet includes a field storing a PTS and the like.

An example of the contents described in a PAT and PMT will be described with reference to FIG. 8. As described above, the PAT 301 is obtained by detecting one or more TS packets whose PID is 0x0000. The PAT 301 describes the PIDs of one or more PMTs corresponding to one or more programs included in content data. In the case shown in FIG. 8, the PAT 301 describes that the PID of a PMT corresponding to a program with a program number of 1 is 0x0010. For this reason, based on the PID (in this case, 0x0010) of the PMT described in the PAT, a PMT 302 is obtained by detecting one or more TS packets whose PID is 0x0010.

The PMT 302 describes the PID (in this case, 0x0100) of one or more TS packets generated by packetizing a video stream of a program and the PID (in this case, 0x0101) of one or more TS packets generated by packetizing an audio stream of the program. Therefore, the one or more TS packets for the video stream is obtained by detecting a TS packet whose PID is 0x0100 based on the PID described in a PMT. The one or more TS packets for the audio stream are also obtained by detecting a TS packet whose PID is 0x0101.

An example of index information will be described with reference FIGS. 9 and 10.

Figures 9, 10:
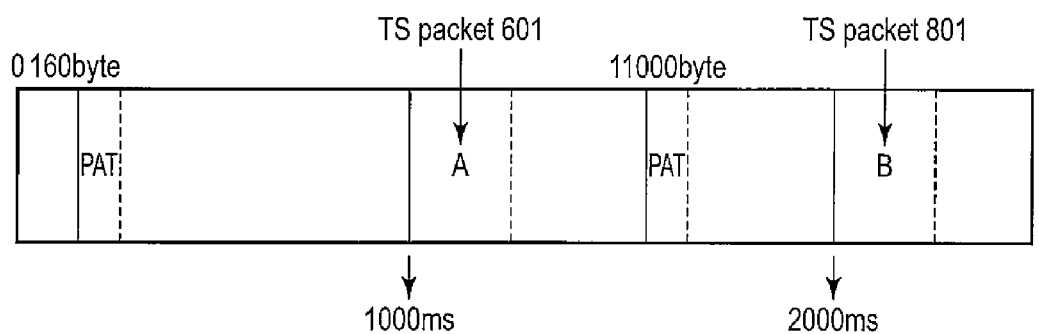
FIG. 9 is an exemplary view for explaining a buffer used by the player software in FIG. 4.
FIG. 10 is an exemplary view for explaining index information generated by the player software in FIG. 4.

Assume that as shown in FIG. 9, the TS packet 601 in which the random-access-indicator flag (random_access_indicator) is set is stored at storage position A in the buffer 42, and another TS packet 801 in which the random-access-indicator flag (random_access_indicator) is set is stored at storage position B in the buffer 42. Assume that in the buffer 42, the first PAT which is located immediately before the storage position A is stored at the 160th byte from the start of the buffer 42. Assume also that in the buffer 42, the second PAT which is located immediately before the storage position B is stored at the 11000th byte from the start of the buffer 42.

In this case, the payload of the TS packet 601 or the payload of the TS packet 602 includes the header of the PES packet 501. By referring to the payload of the TS packet 601 or the payload of the TS packet 602, the PTS of the video frame included in the PES packet 501 is acquired. The acquired PTS is converted into a time stamp (in this case, 1000 milliseconds) indicative of the presentation time (playback time) of the corresponding randomly accessible video frame. Note that a time stamp of the start of the content is 0.

Likewise, the payload of the TS packet 801 or the payload of the TS packet 802 includes the header of the FES packet 701. By referring to the payload of the TS packet 801 or the payload of the TS packet 802, the PTS of the video frame included in the PES packet 701 is acquired. The acquired PTS is converted into a time stamp (in this case, 2000 milliseconds) indicative of the presentation time (playback time) of the corresponding randomly accessible video frame. Note that a time stamp of the start of the content is 0.

FIG. 10 shows an example of index information. When the TS packet 601 is received, a pair of an intra-buffer offset (=160) of a PAT and a time stamp (=1000) is generated as index information. Likewise, when the TS packet 801 is received, a pair of an intra-buffer offset (=11000) of a PAT and a time stamp (=2000) is generated as index information.

In the case shown in FIGS. 9 and 10, if, for example, the seek destination time corresponding to a change destination playback position by seek operation is 950 milliseconds, a random access point (time stamp=1000 milliseconds) immediately after the seek destination time is determined as a seek destination position. Content data corresponding to the change destination position is then played back by using the PAT stored at a storage position corresponding to the offset value=160 bytes.

Another example of index information will be described with reference to FIGS. 11 and 12.

Assume that as shown in FIG. 11, the TS packet 601 in which the random-access-indicator flag (random_access_indicator) is set is stored at storage position A at the 9000th byte from the start of the buffer 42. A PAT which is located immediately before the storage position A in the buffer 42 is stored at the 160th byte from the start of the buffer 42, and a PMT corresponding to the PID described in the PAT is stored at the 500th byte from the start of the buffer 42. Note that the PID of the video stream described in this PMT is identical to the PID of the TS packet 601 in which the random-access-indicator flag (random_access_indicator) is set.

In this case, the payload of the TS packet 601 or the payload of the TS packet 602 includes the header of the PES packet 501. By referring to the payload of the TS packet 601 or the payload of the TS packet 602, the PTS of the video frame included in PES packet 501 is acquired. The acquired PTS is converted into a time stamp (in this case, 1000 milliseconds) indicative of the presentation time (playback time) of the corresponding randomly accessible video frame. Note that a time stamp of the start of the content is 0. In addition, the immediately preceding PAT and PMT are inserted immediately before the TS packet 601 (at the 9000th byte from the start of the buffer 42).

FIG. 12 shows an example of index information. When the TS packet 601 is received, a pair of an intra-buffer offset (=9000) of a PAT and a time stamp (=1000) is generated as index information.

In the case shown in FIGS. 11 and 12, if, for example, the seek destination time corresponding to a change destination playback position by seek operation is 950 milliseconds, a random access point (time stamp=1000 ms) immediately after the seek destination time is determined as a seek destination position. Content data corresponding to the change destination playback position is then played back by using the data stored at a storage position corresponding to offset value=9000 bytes (the PAT, PMT, TS packet 601, and the like).

As shown in FIG. 13, if a PAT and/or a PMT are not stored before the TS packet 601 in which the random-access-indicator flag (random_access_indicator) is set in the buffer 42, a PAT and/or a PMT may be generated and inserted immediately before the TS packet 601.

In this case, the payload of the TS packet 601 or the payload of the TS packet 602 includes the header of the PES packet 501. By referring to the payload of the TS packet 601 or the payload of the TS packet 602, the PTS of the video frame in the PES packet 501 is acquired. The acquired PTS is converted into a time stamp (in this case, 1000 milliseconds)

indicative of the presentation time (playback time) of the corresponding randomly accessible video frame. Note that a time stamp of the start of the content is 0. In addition, the TS packet 604, which includes the audio stream and is located after (immediately after) the TS packet 601 including the video stream in the buffer 42, is detected. By using the PIDs of the TS packets 601 and 604, a PMT describing these PIDs and a PAT describing the PID of the PMT are newly generated. The generated PAT and PMT are inserted immediately before the TS packet 601 (at the 9000th byte from the start of the buffer 42).

As in the case shown in FIG. 13, therefore, when the TS packet 601 is received, a pair of an intra-buffer offset (=9000) of an inserted PAT and a time stamp (=1000) is generated as index information in the same manner as shown in FIG. 12.

An example of the procedure of index generation processing executed by the player application program 202 will be described with reference to the flowcharts of FIGS. 14, 15, and 16.

Figure 14:
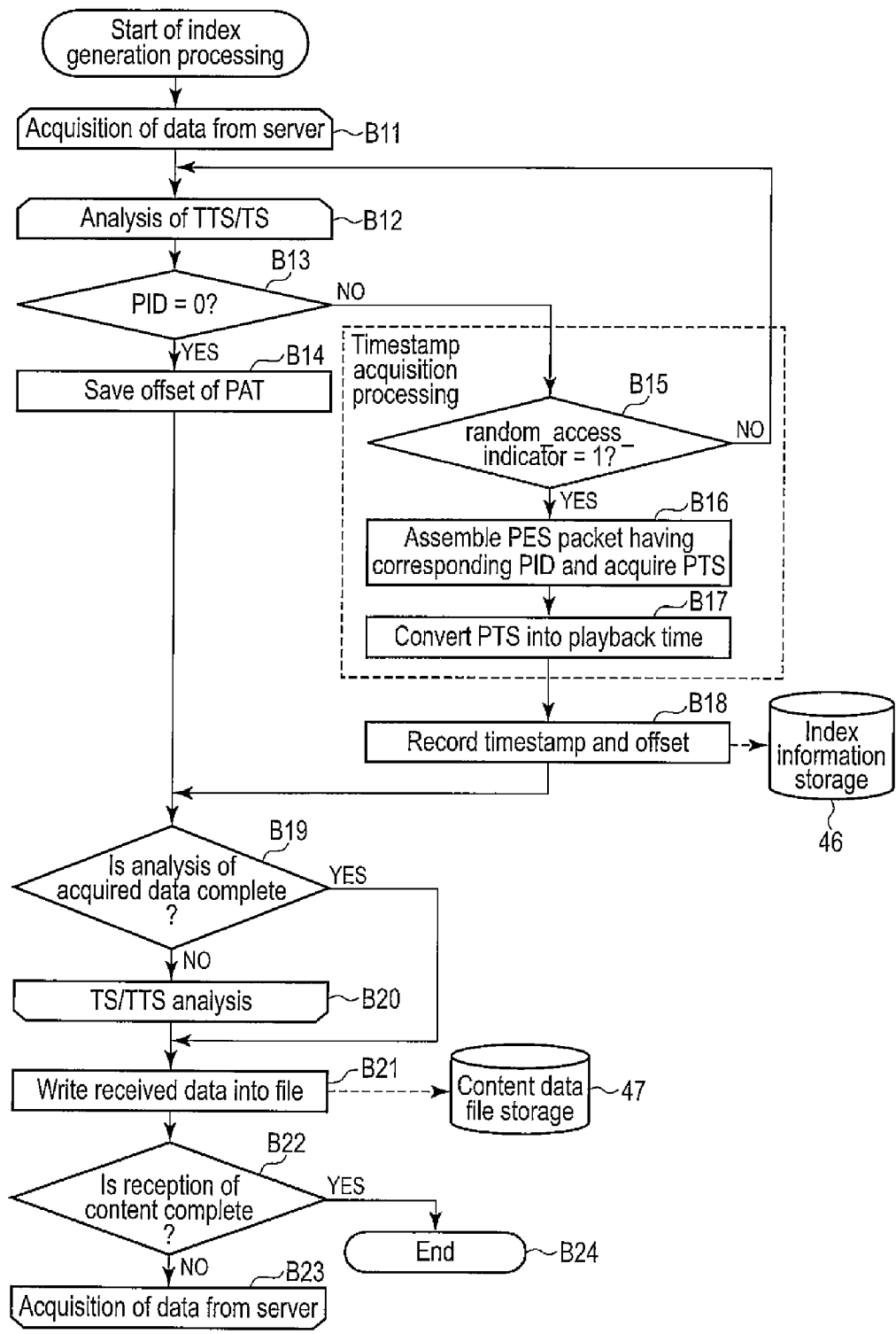
FIG. 14 is an exemplary flowchart showing the procedure of index generation processing executed by the player software in FIG. 4.

The index generation processing shown in FIG. 14 includes a loop of reception processing (blocks B11 to B23) for sequentially receiving data from the server 21. This loop of reception processing (blocks B11 to B23) includes a loop of analysis processing (blocks B12 to B20) for analyzing the TTS/TS packets received from the server 21 and generating index information described above.

First of all, the data source 41 receives a TTS/TS packet group constituting a stream of content data from the server 21 (block B11). The received TTS/TS packet group is stored in the buffer 42. Every time the data source 41 receives a TTS/TS packet, the packet analyzer 40 executes the following processing.

The program information detector 43 determines whether the packet identifier (PID) of the received TTS/TS packet is "0" (0x0000) (block B13). That is, the program information detector 43 determines whether the received TTS/TS packet is a TTS/TS packet (first packet) including a program association table (PAT). If the PID is 0 (YES in block B13), the program information detector 43 saves the storage position (offset) of the PAT in the buffer 42 (block B14).

If the PID is not 0 (NO in block B13), the random access information detector 44 determines whether the received TTS/TS packet is a TTS/TS packet in which a random-access-indicator flag (random_access_indicator) is set (block B15). That is, the random access information detector 44 determines whether the random-access-indicator flag (random_access_indicator) set in the received TTS/TS packet is "1". Note that the random access information detector 44 may determine, based on the flag set in a predetermined field in the header of the received TTS/TS packet, whether the TTS/TS packet is a TTS/TS packet corresponding to the random access point.

If the received TTS/TS packet is a TTS/TS packet in which a random-access-indicator flag (random_access_indicator) is set, i.e., the start TTS/TS packet of a TTS/TS packet group for carrying a randomly accessible video frame (YES in block B15), the random access information detector 44 executes the processing for acquiring a time stamp (PTS) existing in the header of a PES packet corresponding to the received TTS/TS packet (block B16).

In block B16, the random access information detector 44 acquires (detects) a time stamp (PTS) indicative of the presentation time of a randomly accessible video frame from the payload of the received TTS/TS packet or the payload of another received TTS/TS packet having the same PID as the PID of the received TTS/TS packet.

Alternatively, the index generator 45 may assemble a PES packet by using the received TTS/TS packet and all other received TTS/TS packets having the same PID as the PID of the received TTS/TS packet and acquire a time stamp (PTS) from the header of the PES packet. Obviously, it is not always necessary to assemble an overall PES packet. The data source 41 may assemble the header of a PES packet by using the received TTS/TS packet and one or more other received TTS/TS packets having the same PID as the PID of the received TTS/TS packet.

The random access information detector 44 converts the acquired PTS into a time stamp indicative of the presentation time (playback time) of a corresponding randomly accessible video frame (block B17). Note that a time stamp of the start of the content is 0. The processing in blocks B15 to B17 described above will also be referred to as time stamp acquisition processing. The index generator 45 generates index information indicative of the converted time stamp and the storage position (offset) of the PAT in the buffer 42, and stores the information in the index information storage area 46 (block B18).

The index generator 45 determines whether the analysis processing for all the TTS/TS packets acquired from the server 21 is complete (block B19). The apparatus repeatedly executes the analysis processing in blocks B12 to B20 until the completion of analysis processing for all the acquired TTS/TS packets.

If the analysis processing for all the acquired TTS/TS packets is complete (YES in block B19), the index generator 45 writes the received content data (i.e., the content data stored in the buffer 42) into a file, and stores the file in the content data file storage area 47 (block B21). The data source 41 then determines whether the reception of content data is complete (block B22). The reception processing in blocks B11 to B23 is repeatedly executed until the completion of reception of the content data. If the reception of the content data is complete (YES in block B22), the index generation processing terminates (block B24).

Figure 15:
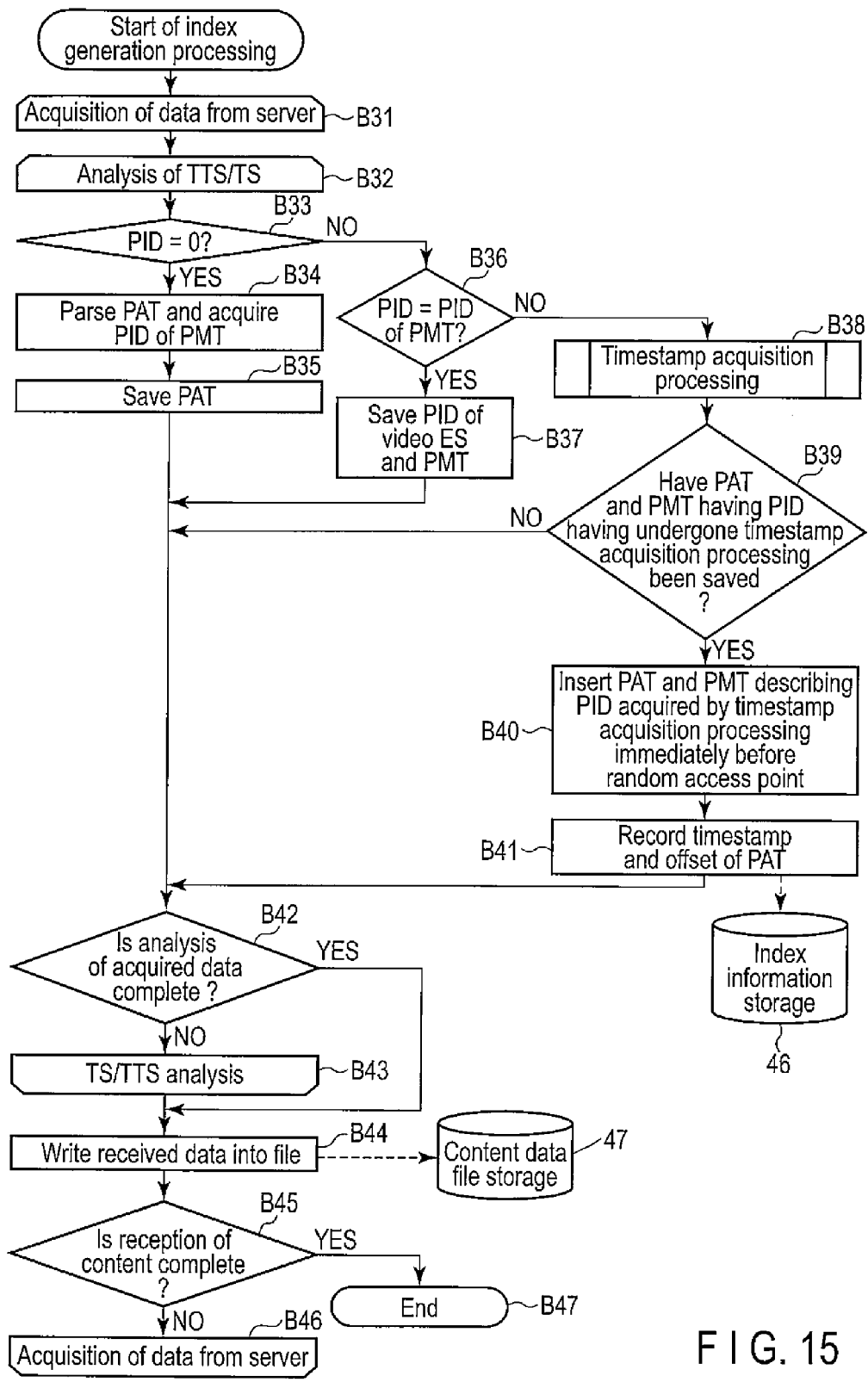
FIG. 15 is an exemplary flowchart showing another procedure of index generation processing executed by the player software in FIG. 4.

The index generation processing shown in FIG. 15 includes a loop of reception processing (blocks B31 to B46) for sequentially receiving data from the server 21. This loop of reception processing (blocks B31 to B46) includes a loop of analysis processing (blocks B32 to B43) for analyzing the TTS/TS packets received from the server 21 and generating index information described above.

First of all, the data source 41 receives a TTS/TS packet group constituting a stream of content data from the server 21 (block B31). The received TTS/TS packet group is stored in the buffer 42. Every time the data source 41 receives a TTS/TS packet, the packet analyzer 40 executes the following processing.

The program information detector 43 determines whether the packet identifier (PID) of the received TTS/TS packet is "0" (0x0000) (block B33). That is, the program information detector 43 determines whether the received TTS/TS packet is a TTS/TS packet (first packet) including a program association table (PAT). If the PID is 0 (YES in block B33), the program information detector 43 assembles (i.e., parses) a section corresponding to a PAT by using the TTS/TS packet whose PID is 0, and acquires the packet identifier (PID) of the program map table (PMT) described in the PAT (block B34). The program information detector 43 then saves the PAT (block B35).

If the PID is not 0 (NO in block B33), the program information detector 43 determines whether the PID of the received TTS/TS packet is identical to the PID of the PMT acquired in block B34 (block B36). That is, the program information detector 43 determines whether the received TTS/TS packet is a TTS/TS packet (third packet) including a PMT.

If the PID of the received TTS/TS packet is identical to the PID of the PMT (YES in block B36), the program information detector 43 assembles (i.e., parses) a section corresponding to the PMT by using the TTS/TS packet having the PID of the PMT, and saves the PMT and a PID of a TTS/TS packet the video elementary stream (video ES) described in the PMT (block B37).

If the PID of the received TTS/TS packet is not identical to the PID of the PMT (NO in block B36), the random access information detector 44 executes the time stamp acquisition processing shown in blocks B15 to B17 in FIG. 14 (block B38). In the time stamp acquisition processing, if the received TTS/TS packet is a TTS/TS packet in which a random-access-indicator flag (random_access_indicator) is set, the random access information detector 44 acquires a time stamp (PTS) existing in the header of a PES packet corresponding to the received TTS/TS packet. The random access information detector 44 converts the acquired PTS into a time stamp indicative of the presentation time of a corresponding randomly accessible video frame. Note that a time stamp of the start of the content is 0.

The index generator 45 then determines whether both of a PAT and a PMT, which describes the PID of the TTS/TS packet from which a time stamp has been acquired in block B38, have been saved (block B39). The index generator 45 determines whether the PMT, which describes the PID of the TTS/TS packet from which the time stamp has been acquired in block B38, has been saved by determining whether, for example, the PID of the TTS/TS packet from which the time stamp has been acquired in block B38 is identical to the PID of the video ES saved in block B37.

If both of the PAT and the PMT have been saved (YES in block B39), the index generator 45 inserts the PAT and the PMT immediately before the position of the detected random access point in the buffer 42 (block B40). The index generator 45 then generates index information indicative of the converted time stamp and the storage position (offset) of the PAT in the buffer 42, and stores the information in the index information storage area 46 (block B41). The process then advances to block B42. If at least one of the PAT and the PMT, which describes the PID of the TTS/TS packet from which the time stamp has been acquired in block B38, has not been saved (NO in block B39), the process advances to block B42.

The index generator 45 then determines whether the analysis processing for all the TTS/TS packets acquired from the server 21 is complete (block B42). The analysis processing in blocks B32 to B43 is repeatedly executes until the completion of the analysis processing for all the acquired TTS/TS packets.

If analysis processing for all the acquired TTS/TS packets is complete (YES in block B42), the index generator 45 writes the received content data (i.e., the content data stored in the buffer 42) into a file, and stores the file in the content data file storage area 47 (block B44). The data source 41 determines whether the reception of the content data is complete (block B45). The reception processing in blocks B31 to B46 is repeatedly executed until the completion of reception of content data. If the reception of the content data is complete (YES in block B45), the index generation processing terminates (block B47).

Like the processing shown FIGS. 14 and 15, the index generation processing shown in FIG. 16 includes a loop of reception processing (blocks B51 to B67) for sequentially receiving data from the server 21. This loop of reception processing (blocks B51 to B67) includes a loop of analysis processing (blocks B52 to B64) for analyzing the TTS/TS packets received from the server 21 and generating index information described above.

First of all, the data source 41 receives a TTS/TS packet group constituting a stream of content data from the server 21 (block B51). The received TTS/TS packet group is stored in the buffer 42. Every time the data source 41 receives a TTS/TS packet, the packet analyzer 40 executes the following processing.

The program information detector 43 determines whether the packet identifier (PID) of the received TTS/TS packet is "0" (0x0000) (block B53). That is, the program information detector 43 determines whether the received TTS/TS packet is a TTS/TS packet (first packet) including a program association table (PAT). If the PID is 0 (YES in block B53), the program information detector 43 assembles (i.e., parses) a section corresponding to a PAT by using the TTS/TS packet whose PID is 0, and acquires the packet identifier (PID) of the program map table (PMT) described in the PAT (block B54). The program information detector 43 then saves the PAT (block B55). The process then advances to block B63.

If the PID is not 0 (NO in block B53), the program information detector 43 determines whether the PID of the received TTS/TS packet is identical to the PID of the PMT acquired in block B54 (block B56). That is, the program information detector 43 determines whether the received TTS/TS packet is a TTS/TS packet (third packet) including a PMT.

If the PID of the received TTS/TS packet is identical to the PID of the PMT (YES in block B56), the program information detector 43 assembles (i.e., parses) a section corresponding to the PMT by using the TTS/TS packet having the PID of the PMT, and saves the PMT and the PID of a TTS/TS packet including the video elementary stream (video ES) described in the PMT (block B57). The process then advances to block B63.

If the PID of the received TTS/TS packet is not identical to the PID of the PMT (NO in block B56), the random access information detector 44 executes the time stamp acquisition processing shown in blocks B15 to B17 in FIG. 14 (block B58). In the time stamp acquisition processing, if the received TTS/TS packet is a TTS/TS packet (i.e., the random access point) in which a random-access-indicator flag (random_access_indicator) is set, the random access information detector 44 acquires a time stamp (PTS) existing in the header of a PES packet corresponding to the received TTS/TS packet. The random access information detector 44 converts the acquired PTS into a time stamp indicative of the presentation time of a corresponding randomly accessible video frame. Note that a time stamp of the start of the content is 0.

The index generator 45 then determines whether both of a PAT and a PMT, which describes the PID of the TTS/TS packet from which a time stamp has been acquired in block B58, have been saved (block B59). The index generator 45 determines whether a PMT, which describes the PID of the TTS/TS packet from which the time stamp has been acquired in block B58, has been saved by determining whether, for example, the PID of the TTS/TS packet from which the time stamp has been acquired in block B58 is identical to the PID of the video ES saved in block B57.

If at least one of a PAT and a PMT, which describes the PID of the TTS/TS packet from which the time stamp has been acquired in block B58, has not been saved (NO in block B59), the index generator 45 detects the PID of a TTS/TS packet (fourth packet) including an audio elementary stream (audio ES) which is placed after the TTS/TS packet corresponding to the detected random access point, and generates the fifth packet including a PAT and the sixth packet including a PMT by using the PID of the TTS/TS packet from which the time stamp has been acquired in block B58 (i.e., the PID of the second packet including the video ES) and the PID of the detected fourth packet including the audio ES (block B60). The index generator 45 inserts the generated fifth packet (PAT) and sixth packet (PMT) immediately before the position of the detected random access point in the buffer 42 (block B61). The index generator 45 generates index information indicative of the converted time stamp and the storage position (offset) of the fifth packet (PAT) in the buffer 42, and stores the information in the index information storage area 46 (block B62). The process advances to block B63.

If the apparatus has saved both of the PAT and the PMT (YES in block B59), the process advances to block B61 described above.

The index generator 45 determines whether the analysis processing for all the TTS/TS packets acquired from the server 21 is complete (block B63). The analysis processing in blocks B52 to B64 is repeatedly executed until the completion of the analysis processing for all the acquired TTS/TS packets.

If the analysis processing for all the acquired TTS/TS packets is complete (YES in block B63), the index generator 45 writes the received content data (i.e., the content data stored in the buffer 42) into a file, and stores the file in the content data file storage area 47 (block B65). The data source 41 determines whether the reception of the content data is complete (block B66). The reception processing in blocks B51 to B67 is repeatedly executed until the completion of reception of content data. If the reception of the content data is complete (YES in block B66), the index generation processing terminates (block B68).

As has been described above, according to this embodiment, it is possible to reduce the amount of processing for the generation of index information corresponding to content data and to generate index information at high speed. In this embodiment, the first packet including a PAT is detected from a received packet and the second packet in which a random access indicator flag indicating that the packet is the start packet of a packet group for carrying a randomly accessible video frame is set is detected. Upon detecting the second packet, a time stamp (PTS) indicative of the presentation time of the randomly accessible video frame is acquired from the second packet or another received packet having the same packet identifier as the packet identifier of the second packet. Index information indicative of the acquired presentation time and the storage position of the first packet in the buffer 42 is then generated. The index information is generated at the time of reception of content data, and the generated index information is stored in association with the content data in a storage device or the like. That is, in the storage device, content data which allows high seek operation accuracy and high response is stored.

The player application program 202 can determine a data portion for playback at a change destination playback position (seek position) from the content data in the buffer 42 based on the index information. That is, the player application program 202 can execute seek processing for changing the current playback position of content data to another playback position based on this index information. This can improve the response of seek processing.

Note that all the processing procedures in this embodiment described with reference to the flowcharts of FIGS. 14, 15, and 16 can be executed by software. For this reason, it is possible to easily implement the same effects as those of the embodiment by only installing the programs for executing these processing procedures in a general computer via a computer-readable storage medium and executing the programs.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus configured to receive a first packet group of a stream of content data comprising one or more programs from a server, the apparatus comprising:
    a buffer configured to store the first packet group;
    a program information detector configured to detect a first packet of the first packet group, the first packet comprising program information for a configuration of the one or more programs;
    a random access information detector
        configured to detect a second packet of a second packet group from among the first packet group, the second packet group carrying a randomly accessible video frame, and the second packet being a start packet of the second packet group and
        configured to detect a time stamp from the second packet or from another received packet having the same packet identifier as a packet identifier of the second packet, the time stamp being indicative of a presentation time of the randomly accessible video frame; and
    an index generator configured to generate index information indicative of a storage position of the first packet in the buffer, and of the time stamp.

2. The apparatus of claim 1, wherein the random access information detector is configured to detect the second packet in which a flag is set, the flag being indicative of the start packet of the second packet group.

3. The apparatus of claim 2, wherein the server is configured to set the flag in the second packet.

4. The apparatus of claim 1, wherein the program information detector is configured to detect a packet in which 0 is set to a packet identifier as the first packet for carrying a program association table (PAT).

5. The apparatus of claim 1, wherein the program information comprises a program association table (PAT) describing a correspondence between the one or more programs and one or more packet identifiers of packets comprising a program map table (PMT), and
    the program map table describes a packet identifier of a packet corresponding to an elementary stream of a first program of the one or more program.

6. The apparatus of claim 5, wherein the program information detector is configured to detect the first packet comprising the program association table, and configured to detect a third packet comprising the program map table by using the program association table, and wherein when the program map table describes a packet identifier of the second packet, the index generator is configured to insert the first packet and the third packet immediately before the second packet in the buffer, and configured to generate the index information indicative of a storage position of the inserted first packet in the buffer, and of the time stamp.

7. The apparatus of claim 5, wherein
when at least one of the first packet and a third packet is not detected before detection of the second packet, the third packet comprising the program map table in which a packet identifier of the second packet is described,
the index generator is
configured to detect a fourth packet of the first packet group, the fourth packet corresponding to an audio stream and being received after the second packet,
configured to generate a fifth packet comprising a program association table and a sixth packet comprising a program map table by using the packet identifier of the second packet and a packet identifier of the fourth packet,
configured to insert the fifth packet and the sixth packet immediately before the second packet in the buffer, and
configured to generate the index information indicative of a storage position of the inserted fifth packet in the buffer, and of the time stamp.

8. The apparatus of claim 5, wherein the program map table describes a packet identifier of a packet corresponding to a video stream of the first program, and a packet identifier of a packet corresponding to an audio stream of the first program.

9. The apparatus of claim 1, wherein the random access information detector is configured to assemble a header of a packetized elementary stream (PES) packet for carrying the randomly accessible video frame by using the second packet and one or more of other received packets having the same packet identifier as the packet identifier of the second packet and configured to detect the time stamp from the assembled header.

10. The apparatus of claim 1, wherein the first packet group is a transport stream (TS) packet group.

11. An index generation method of receiving a first packet group of a stream of content data comprising one or more programs, the method comprising:
storing the first packet group in a buffer;
detecting a first packet of the first packet group, the first packet comprising program information for a configuration of the one or more programs;
detecting a second packet of a second packet group from among the first packet group, the second packet group carrying a randomly accessible video frame, and the second packet being a start packet of the second packet group, and detecting a time stamp from the second packet or from another received packet having the same packet identifier as a packet identifier of the second packet, the time stamp being indicative of a presentation time of the randomly accessible video frame; and
generating index information indicative of a storage position of the first packet in the buffer, and of the time stamp.

12. A computer-readable, non-transitory storage medium having stored thereon a computer program, which is configured to control a computer to receive a first packet group of a stream of content data comprising one or more programs from a server, the computer program controlling the computer to execute functions of:
storing the first packet group in a buffer;
detecting a first packet of the first packet group, the first packet comprising program information for a configuration of the one or more programs;
detecting a second packet of a second packet group from among the first packet group, the second packet group carrying a randomly accessible video frame, and the second packet being a start packet of the second packet group, and detecting a time stamp from the second packet or from another received packet having the same packet identifier as a packet identifier of the second packet, the time stamp being indicative of a presentation time of the randomly accessible video frame; and
generating index information indicative of a storage position of the first packet in the buffer, and of the time stamp.

* * * * *